United States Patent [19]
Puschell

[11] Patent Number: 5,512,998
[45] Date of Patent: Apr. 30, 1996

[54] CONTACTLESS METHOD AND SYSTEM FOR DETERMINING STATIC AND DYNAMIC CHARACTERISTICS OF TARGET OBJECTS

[75] Inventor: Jeffrey J. Puschell, Albuquerque, N.M.

[73] Assignee: The Titan Corporation, San Diego, Calif.

[21] Appl. No.: 263,575

[22] Filed: Jun. 22, 1994

[51] Int. Cl.⁶ ........................................ G01P 3/36
[52] U.S. Cl. ................................................ 356/28
[58] Field of Search ............................ 356/28; 250/341

[56] References Cited

U.S. PATENT DOCUMENTS

| | | | |
|---|---|---|---|
| 4,696,567 | 9/1987 | Ruger et al. | 356/28 |
| 4,864,515 | 9/1989 | Deck | 364/516 |
| 5,015,868 | 5/1991 | Park | 250/561 |
| 5,056,913 | 10/1991 | Tanaka et al. | 356/4 |
| 5,071,252 | 12/1991 | Matsuura | 356/376 |
| 5,166,533 | 11/1992 | Kajiwara | 250/561 |
| 5,193,120 | 3/1993 | Gamache et al. | 382/1 |
| 5,194,908 | 3/1993 | Lougheed et al. | 356/28 |
| 5,198,877 | 3/1993 | Schulz | 356/375 |
| 5,202,741 | 4/1993 | Snyder | 356/4 |
| 5,204,732 | 4/1993 | Ohmamyuda et al. | 356/4 |

*Primary Examiner*—Mark Hellner
*Attorney, Agent, or Firm*—Edward W. Callan

[57] ABSTRACT

The speed, acceleration and profile of a moving target object, such as a vehicle, are determined by processing signals provided by an array of detector elements in response to detecting a pair of laser beams reflected from the target object. The speed, acceleration and profile determinations are processed to classify the vehicle as belonging to one of a plurality of different predetermined speed, acceleration and profile categories, respectively.

19 Claims, 2 Drawing Sheets

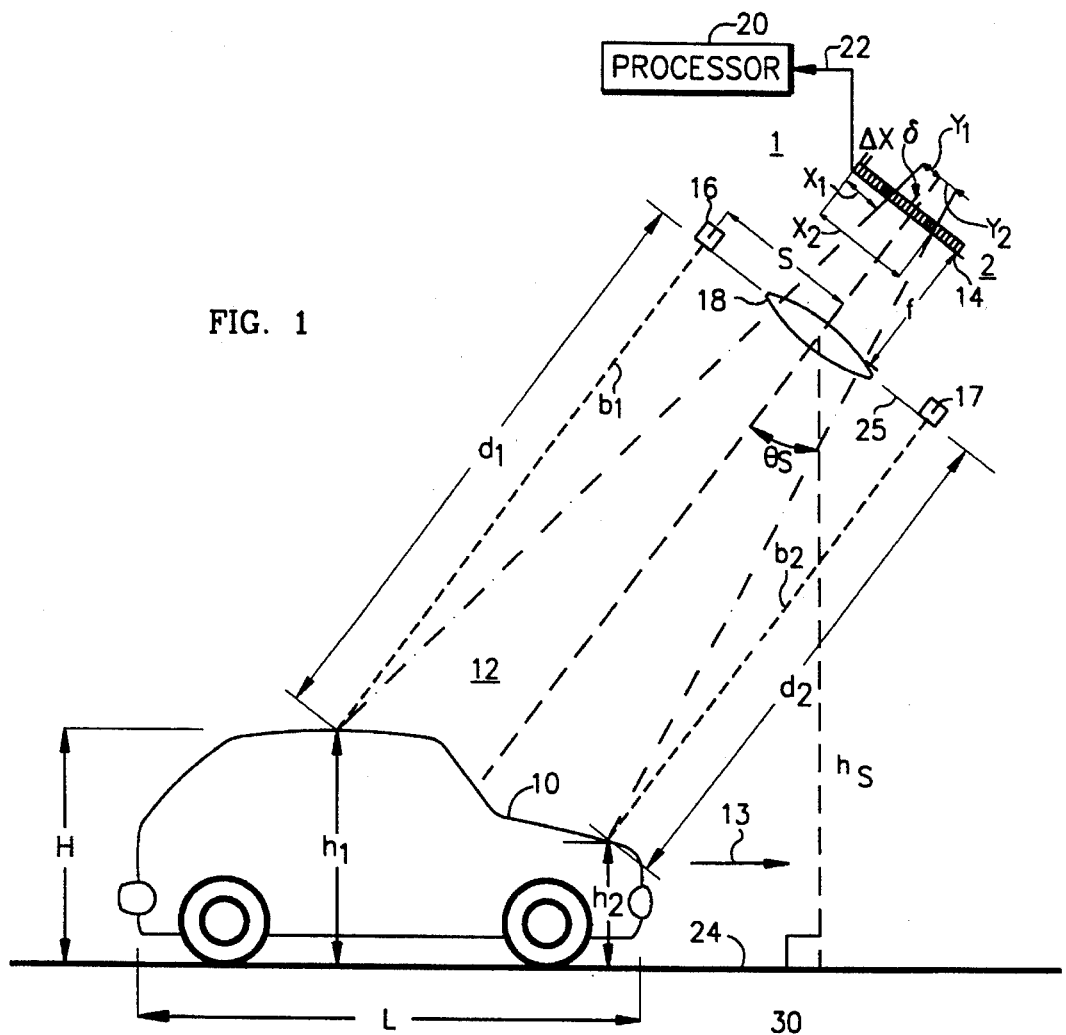
FIG. 1
FIG. 2
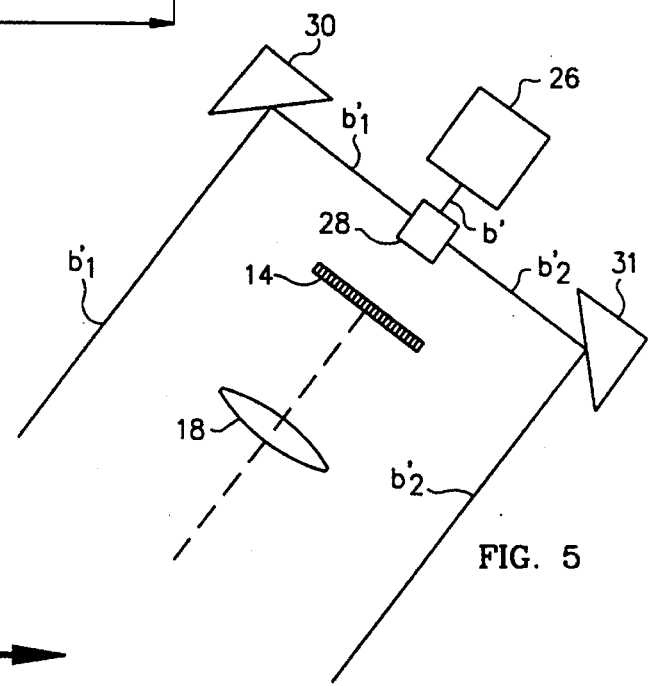
FIG. 5 i# CONTACTLESS METHOD AND SYSTEM FOR DETERMINING STATIC AND DYNAMIC CHARACTERISTICS OF TARGET OBJECTS

BACKGROUND OF THE INVENTION

The present invention pertains to methods and systems for determining various characteristics of target objects, such as vehicles.

Contactless methods and systems for determining static characteristics of objects, such as a profile of an object, are described in U.S. Pat. No. 5,071,252 to Matsuura and U.S. Pat. No. 5,056,913 to Tanaka et al.

SUMMARY OF THE INVENTION

The present invention provides a method of determining characteristics of a target object moving through a given region in a predetermined direction, comprising the steps of (a) detecting electromagnetic radiation of a predetermined wavelength received from the given region with an array of detector elements aligned in the predetermined direction and facing the given region and providing signals representative of said radiation detected by the detector elements; (b) propagating radiation of said predetermined wavelength along a pair of fixed paths into the given region from positions disposed adjacent opposite ends of the array of detector elements so that said radiation is reflected from the given region generally toward the array of detector elements; (c) collecting and focussing upon the array of detector elements, said radiation reflected from the given region; and (d) processing the signals provided by the detector elements to determine at least one dynamic characteristic, such as speed, of a target object moving through a given region in a predetermined direction.

The present invention also provides a system for determining characteristics of a target object moving through a given region in a predetermined direction, the system comprising an array of detector elements aligned in the predetermined direction and facing the given region for detecting electromagnetic radiation of a predetermined wavelength received from the given region and for providing signals representative of said radiation detected by the detector elements; a pair of sources of radiation of said predetermined wavelength disposed adjacent opposite ends of the array of detector elements for propagating said radiation along a respective pair of fixed paths into the given region so that said radiation is reflected from the given region generally toward the array of detector elements; a lens disposed for collecting and focussing said radiation reflected from the given region upon the array of detector elements; and a processor coupled to the detector elements and adapted for processing the signals provided by the detector elements to determine at least one dynamic characteristic, such as speed, of a target object moving through a given region in a predetermined direction.

The processor is further adapted for determining a profile of the target object by processing the signals provided by the detector elements to determine a height above a background surface of each of a series of sampled segments of the object from which radiation of the predetermined wavelength is reflected to the array of detector elements as the object is moving through the given region in said predetermined direction and by combining the height determinations with the speed determinations to determine the profile of the target object.

In another aspect, the present invention provides a system for classifying objects, comprising an array of detector elements facing a given region for detecting electromagnetic radiation of a predetermined wavelength received from the given region and for providing signals representative of said radiation detected by the detector elements; at least one source of radiation of said predetermined wavelength disposed for propagating said radiation into the given region so that said radiation is reflected from the given region generally toward the array of detector elements; a lens disposed for collecting and focussing said radiation reflected from the given region upon the array of detector elements; and a processor coupled to the detector elements and adapted for processing the signals provided by the detector elements to determine a profile of a target object within the given region, and to classify the object in accordance with the determined profile as belonging to one of a plurality of different profile categories.

In this other aspect, the present invention also provides a method for classifying objects, comprising the steps of (a) detecting electromagnetic radiation of a predetermined wavelength received from a given region with an array of detector elements facing the given region and providing signals representative of said radiation detected by the detector elements; (b) propagating radiation of said predetermined wavelength into the given region so that said radiation is reflected from the given region generally toward the array of detector elements; (c) collecting and focussing upon the array of detector elements, said radiation reflected from the given region; (d) processing the signals provided by the detector elements to determine a profile of a target object within the given region; and (e) classifying the object in accordance with the determined profile as belonging to one of a plurality of different profile categories.

Additional features of the present invention are described in relation to the detailed description of the preferred embodiments.

BRIEF DESCRIPTION OF THE DRAWING

FIG. 1 is a block diagram of a preferred embodiment of the system of the present invention.

FIG. 2 is an exemplary graph of a cross correlation of vehicle profile segments as a function of the index used in the discrete Fourier transform used for determining cross correlation.

FIG. 5 is a diagram of a system of light beam sources for use in the system of FIG. 1 in lieu of the pair of lasers shown therein.

DETAILED DESCRIPTION

Figure 3:
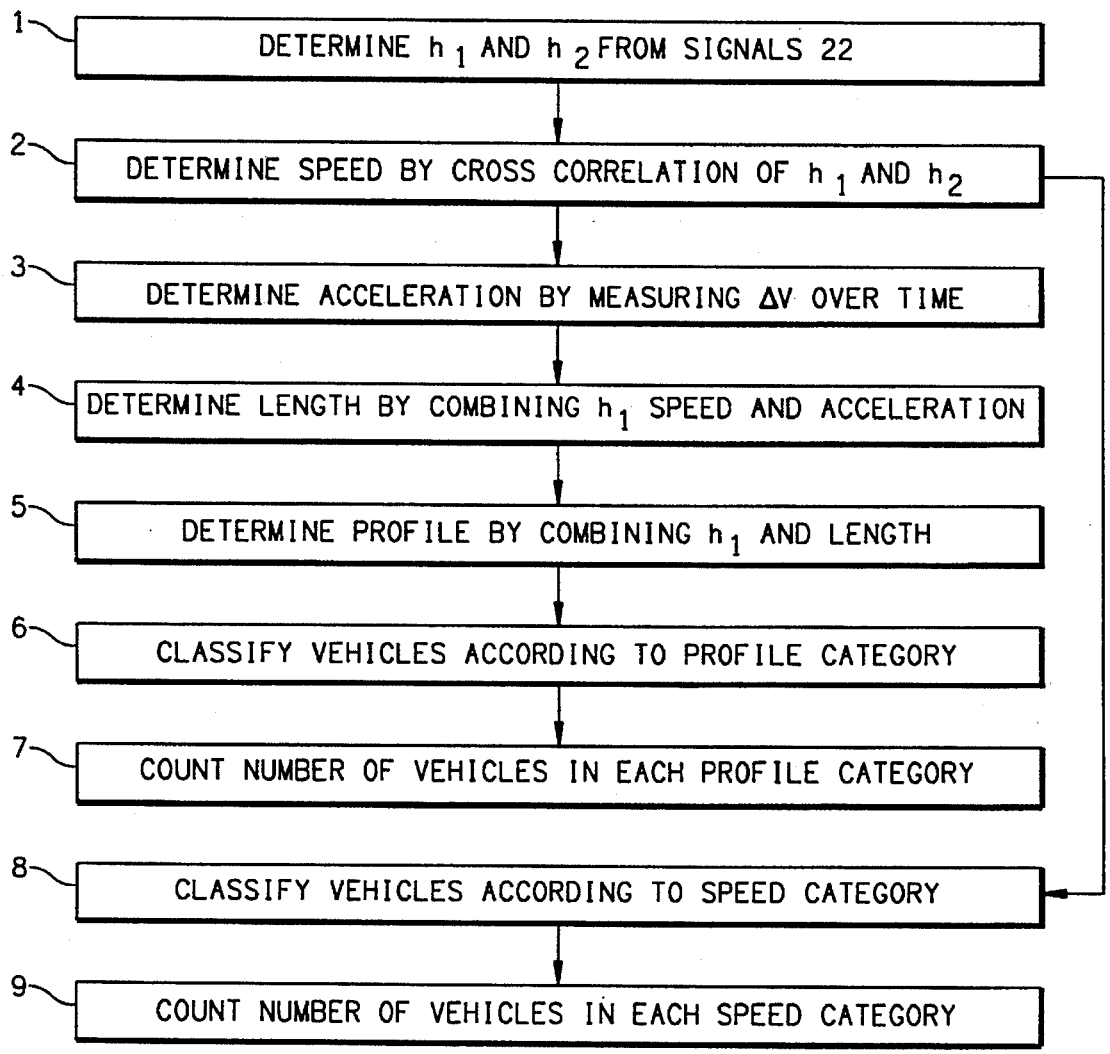
FIG. 3 is a diagram of the broad processing steps performed by the processor in the system of FIG. 1.

Referring to FIG. 1, a preferred embodiment of a system according to the present invention for determining characteristics of a target object 10, such as a motor vehicle, moving through a given region 12 in a predetermined direction 13 includes an array of detector elements 14, a pair of lasers 16, 17, a lens 18 and a processor 20. In the preferred embodiment, the processor 20 is a microcomputer.

The array of detector elements 14 is aligned in the predetermined direction and faces the given region 12 for detecting electromagnetic radiation of a predetermined wavelength received from the given region 12 and provides signals 22 representative of the radiation detected by each of the detector elements 14.

The pair of lasers 16, 17 are sources of radiation of the predetermined wavelength. The pair of lasers 16, 17 are disposed adjacent opposite ends of the array of detector elements 14 equidistant from the optical axis of the lens 18 and aligned in the predetermined direction 13 for respectively propagating the radiation in a first light beam $b_1$ and in a second light beam $b_2$ along a pair of fixed paths into the given region 12 so that the radiation is reflected from the given region 12 generally toward the array of detector elements 14. The optical axis of the lens 18 has a nadir angle $\theta$. Preferably, the path of the first light beam $b_1$ and the path of the second light beam $b_2$ are parallel to the optical axis of the lens 18; and the nadir angle $\theta$ is within three degrees of zero degrees.

The lens 18 is disposed for collecting and focussing radiation reflected from the given region 12 upon the array of detector elements 14.

The processor 20 is coupled to the detector elements 14 and adapted for processing the signals 22 provided by the detector elements 14 to determine the speed, acceleration and profile of a target object, such as a motor vehicle 10, moving through the given region 12 in the predetermined direction 13.

The height component of the vehicle profile is determined by processing the electrical signals 22 provided by the array of detector elements 14, which are sampled at a rate of at least 200 Hertz, to compute the height h above the background surface 24 of each of a series of sampled segments of the vehicle 10, from which radiation of the predetermined wavelength is reflected to the array of detector elements 14 as the vehicle 10 is moving through the given region 12 in the predetermined direction 13.

The height $h_1$ of a sampled segment of the vehicle 10 contacted by the first light beam $b_1$ propagated from the laser 16 disposed at side 1 of the array of detector elements 14 is determined by computing $$h_1 = h_s + S\sin\theta - d_1 \cos\theta \qquad (Eq.\ 1)$$

wherein $h_s$ is the height of the center of the lens 18 above the background surface 24 in the given area 12.
$\theta$ is the nadir angle of the optical axis of the lens 18;
S is the distance from the optical axis of the lens 18 to the propagation axis of each of the first light bean $b_1$ and the second light beam $b_2$ as measured in a plane 25 bisecting the lens 18 and normal to the optical axis of the lens 18; and
$d_1$ is the distance along the first beam $b_1$ from the plane 25 to the sampled segment of the vehicle 10 from which the first light beam $b_1$ is reflected, wherein $d_1$ is determined by computing $$d_1 = f(1 + S/Y_1) \qquad (Eq.\ 2)$$

wherein f is focal length of the lens 18, and
$Y_1$ is the distance from the center of the array of detector elements 14 to the center of the location on the array to which the reflected first beam $b_1$ is focussed, or $$Y_1 = |X_1 - (L/2 - \delta)| \Delta X \qquad (Eq.\ 3)$$

wherein $X_1$ is the center of the location on the array of detector elements 14 to which the reflected first beam $b_1$ is focussed, as measured by the number of detector elements from side 1 of the array, at which the first laser 16 is positioned;
L is the number of detector elements 14 in the array;
$\delta$ is the number of detector elements by which the center of the array of detector elements 14 is offset from the optical axis of the lens 18; and
$\Delta X$ is the breadth of a single detector element 14 of the array.

The height $h_2$ of a sampled segment of the vehicle 10 contacted by the second light beam $b_2$ propagated from the second laser 17 disposed on side 2 of the array of detector elements 14 is determined by computing $$h_2 = h_s - S\sin\theta - d_2 \cos\theta \qquad (Eq.\ 4)$$

wherein $h_s$, S and $\theta$ are as defined above; and
$d_2$ is the distance along the second beam $b_2$ from the plane 25 to the sampled segment of the vehicle 10 from which the second light beam $b_2$ is reflected, wherein $d_2$ is determined by computing $$d_2 = f(1 + S/Y_2) \qquad (Eq.\ 5)$$

and $Y_2$ is the distance from the center of the array of detector elements 14 to the center of the location on the array to which the reflected second beam $b_2$ is focussed, or $$Y_2 = |X_2 - (L/2 - \delta)| \Delta X \qquad (Eq.\ 6)$$

wherein $X_2$ is the center of the location on the array of detector elements 14 to which the reflected second beam $b_2$ is focussed, as measured by the number of detector elements from side 1 of the array, at which the first laser 16 is positioned, as shown in FIG. 1.

Preferably, $X_j$ (for side j≡1 or 2) is computed from measured amplitudes of signals 22 provided by the respective detector elements 14 of the array in accordance with the following equation:

$$X_j = \{[\Sigma i^2 \text{ for } n(i) > r_j] \div m_j\}^{1/2} \qquad (Eq.\ 7)$$
$$\begin{array}{l} L/2 \text{ (for } j \equiv 1) \text{ or } L \text{ (for } j \equiv 2) \\ i = 1 \text{ (for } j \equiv 1) \text{ or } L/2 + 1 \text{ (for } j \equiv 2) \end{array}$$

wherein i is the number of the detector element as counted from side 1 of the array of detector elements;
n(i) is the amplitude of the signal $22_i$ provided by detector array element i;
$r_j$ is the reference signal amplitude or detection threshold value for the detector elements 14 on side j and is determined by ascertaining a signal amplitude for the detector elements 14 on side j such that there is a specified number of detector elements for which the signal amplitude is at least such amplitude; and
$m_j$ is the number of detector elements 14 on the side j in which the signal amplitude exceeds the reference signal amplitude $r_j$.

The computation defined by Equation 7 enables the center of the location on the array of detector elements 14 to which a reflected laser beam $b_1$, $b_2$ is focussed to be determined by setting a detection threshold that is exceeded at only those detector elements that are within the spot of the laser beam and by calculating the center of distribution of the laser beam spot among those detector elements.

Vehicle speed V is determined by processing the provided electrical signals to compute $$V = S_P \div t_{max}$$

wherein $S_P$ is the projected separation distance between the propagated first light beam $b_1$ and second light beam $b_2$ at the background surface 24, and $t_{max}$ is the elapsed time corresponding to the maximum of cross correlation between vehicle profile segments $h_1^k$ and $h_2^k$.

The cross correlation $X_k(t)$ for each kth segment is determined by computing $$X_k(t) = F^{-1}\{N_k F[h_1^k(t)] F[h_2^k(t)]\} \quad \text{(Eq. 8)}$$

wherein $N_k$ is the number of vehicle height measurements in the kth segment of the complete set of vehicle height measurements, F represents the discrete Fourier transform operation and $F^{-1}$ represents the inverse Fourier transform operation.

An exemplary graph of cross correlation $X_k(t)$ as a function of the index i used in the discrete Fourier transform used for determining cross correlation is shown in FIG. 2.

If the maximum in the cross correlation occurs for an index $i_{max}$ in the discrete Fourier transform F, then $$t_{max} = \Delta t[(X_{max} - 1) \div 2] \quad \text{(Eq. 9)}$$

wherein $\Delta t$ is the sampling interval, and by using parabolic interpolation, $$X_{max} = \frac{-\{3X_k[t(i_{max}-1)] - 4X_k t(i_{max})] + X_k[t(i_{max}+1)]\}}{2\{2X_k[t(i_{max})] - X_k t(i_{max}-1)] - X_k[t(i_{max}+1)]\}} + i_{max} - 1 \quad \text{(Eq. 10)}$$

Vehicle acceleration is determined by computing the change in vehicle speed over the time interval between adjacent segments of the vehicle profile.

Preferably, only the series of the height determinations $h_1$ determined by processing the signals provided in response to the reflections of the first light beam $b_1$ from a vehicle 10 moving in the predetermined direction 13 is used to determine the length and the profile of the vehicle 10.

The length component t of the vehicle profile is determined by the processor 20 processing the series of height determinations $h_1$ in combination with the speed and acceleration determinations.

$$l(i) = l(i-1) + 0.5[V(i) + V(i-1)]\Delta t \quad \text{(Eq. 11)}$$

wherein l(i) is the vehicle length corresponding to a surface height measurement number i;

l(i−1) is the length at the previous (i−1) height measurement; and

V(i) and V(i−1) are associated speed measurements derived from the cross correlation analysis; and by averaging these speed measurements, acceleration also is accounted for.

The vehicle profile is determined by correlating the vehicle height and length measurements.

The foregoing processing steps performed by the processor 20 are summarized with reference to FIG. 3.

In step 1, the processor 20 processes the signals 22 provided by the detector elements 14 that detect reflections of the first light beam $b_1$ from a vehicle 10 moving through the given region 12 to determine the height $h_1$ from the background surface 24 of each of a series of sampled segments of the vehicle 10 from which the first light beam $b_1$ is reflected; and also processes the signals 22 provided by the detector elements 14 that detect reflections of the second light beam $b_2$ from the vehicle 10 moving through the given region 12 to determine the height $h_2$ of each of a series of sampled segments of the vehicle 10 from which the second light beam $b_2$ is reflected.

In step 2, the processor 20 determines the vehicle speed V by combining the projected separation distance $S_P$ of the light beams $b_1$ and $b_2$ on the background surface 24 with a measure of elapsed time $t_{max}$ corresponding to maximum cross correlation of the series of heights $h_1$ and the series of heights $h_2$.

In step 3, the processor 20 determines the vehicle acceleration by measuring any change in speed $\Delta V$ over an integral multiple of the sampling interval $\Delta t$.

In step 4, the processor 20 combines one series of height determinations $h_1$ with the measurements of speed V for each sampling interval to determine the length of the vehicle 10.

In step 5, the processor 20 combines one series of height determinations $h_1$ with the length determination to determine the profile of the vehicle 10.

In step 6, the processor 20 classifies the vehicle 10 according to predetermined profile categories, as described in greater detail below with reference to FIG. 4.

In step 7, the processor 20 counts the number of vehicles 10 classified in each profile category over a predetermined duration.

In step 8, the processor 20 classifies the vehicle 10 according to the determined speed V.

In step 9, the processor 20 counts the number of vehicles 10 classified in each speed category over a predetermined duration.

The processor 20 also classifies the vehicle 10 according to the determined acceleration and counts the number of vehicles 10 classified in each acceleration category over a predetermined duration.

Figure 4:
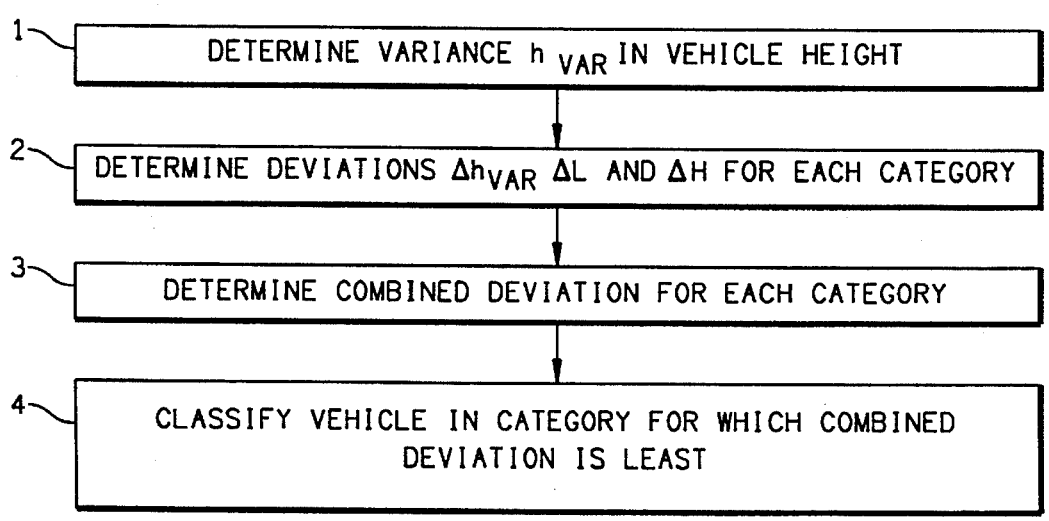
FIG. 4 is a diagram of the steps performed by the processor in the system of FIG. 1 to classify vehicles according to profile category.

Referring to FIG. 4, the processor 20 classifies the vehicle in accordance with the determined profile as belonging to one of a plurality of different predetermined profile categories by performing the following steps:

In step 1, the processor 20 determines the variance $h_{VAR}$ in the height $h_1$ of the vehicle surface from which the beam $b_1$ is reflected from different points i over the length of the vehicle 10 by computing $$h_{VAR} = \sum_{i=1}^{n} q(i)^2/n \quad \text{(Eq. 12)}$$

wherein $$q = h_1 - h_1 \text{ (ave)} \quad \text{(Eq. 13)}$$

and $$h_1(ave) = \sum_{i=1}^{n} h_1(i)/n \quad \text{(Eq. 14)}$$

In step 2, the processor 20 determines deviations $\Delta h_{VAR}$, $\Delta L$ and $\Delta H$ of the height variance $h_{VAR}$, the length L and the overall height H, respectively of the vehicle from predetermined height variance, length and overall height dimensions for each of a plurality of different categories of vehicles. The overall height H is the maximum value of $h_1$ for the vehicle. The height variance, length and overall height dimensions for each category are predetermined by averaging each such dimension of the different vehicles included in the category.

In step 3, the processor 20 determines the combined deviation with respect to each of the different categories by computing $$Dev = (\Delta h_{VAR}^2 + \Delta L^2 + \Delta H^2)^{1/2} \quad \text{(Eq. 15)}$$

In step 4, the processor 20 classifies the vehicle in the category for which the computed combined deviation Dev is the least.

In an alternative preferred embodiment, a system of light beam sources, as shown in FIG. 5, is used in the system of FIG. 1 in lieu of the pair of lasers 16, 17 shown therein. This system includes a single laser 26, a beam splitter 28 and a pair of mirrors 30, 31.

The laser 26 generates a single light beam b' of the predetermined wavelength to which the detector elements 14 are most sensitive and thereby avoids inconsistencies in measurements resulting from light beams of different wavelengths being generated respectively by a pair of lasers, such as shown in the embodiment of FIG. 1.

The beam splitter 28 splits the generated light beam b' into a pair of light beams $b'_1$ and $b'_2$.

The pair of mirrors 30, 31 are disposed adjacent the opposite ends of the array of detector elements 14 in positions on the opposite side of the array of detector elements 14 from the lens 18 for directing the split pair of light beams $b'_1$ and $b'_2$ such that the pair of light beams $b'_1$ and $b'_2$ are propagated along the same respective pair of fixed paths into the given region 12 as the first and second light beams $b_1$ and $b_2$ are propagated in the embodiment shown in FIG. 1.

I claim:

1. A system for determining characteristics of a target object moving through a given region in a predetermined direction, the system comprising an array of detector elements aligned in the predetermined direction and facing the given region for detecting electromagnetic radiation of a predetermined wavelength received from the given region and for providing signals representative of said radiation detected by the detector elements;

a pair of sources of radiation of said predetermined wavelength disposed adjacent opposite ends of the array of detector elements for propagating said radiation along a respective pair of fixed paths into the given region so that said radiation is reflected from the given region generally toward the array of detector elements;

a lens disposed for collecting and focussing said radiation reflected from the given region upon the array of detector elements; and a processor coupled to the detector elements and adapted for processing the signals provided by the detector elements to determine at least one dynamic characteristic of a target object moving through a given region in a predetermined direction.

2. A system according to claim 1, wherein the dynamic characteristic includes speed.

3. A system according to claim 2, wherein the dynamic characteristics further include acceleration.

4. A system according to claim 2, wherein the processor is further adapted for processing the signals provided by the detector elements to determine a profile of the target object.

5. A system according to claim 4, wherein the processor is adapted for determining said profile by processing the signals provided by the detector elements to determine a height above a background surface of each of a series of sampled segments of the object from which radiation of the predetermined wavelength is reflected to the array of detector elements as the object is moving through the given region in said predetermined direction and by combining the height determinations with the speed determinations to determine the profile of the target object.

6. A system according to claim 1, wherein the dynamic characteristics further include acceleration.

7. A system according to claim 1, wherein the processor is further adapted for processing the signals provided by the detector elements to determine a profile of the target object.

8. A system according to claim 1, wherein the pair of radiation beam sources include means for generating a single radiation beam of said predetermined wavelength;

means for splitting the generated radiation beam into a pair of radiation beams; and means for directing the split pair of radiation beams such that said pair of radiation beams are propagated respectively from positions adjacent said opposite ends of the array of detector elements along said respective pair of fixed paths into the given region.

9. A system for classifying objects moving through a given region in a predetermined direction, the system comprising an array of detector elements aligned in the predetermined direction and facing the given region for detecting electromagnetic radiation of a predetermined wavelength received from the given region and for providing signals representative of said radiation detected by the detector elements;

a pair of sources of radiation of said predetermined wavelength disposed adjacent opposite ends of the array of detector elements for propagating said radiation along a respective pair of fixed paths into the given region so that said radiation is reflected from the given region generally toward the array of detector elements;

a lens disposed for collecting and focussing said radiation reflected from the given region upon the array of detector elements; and a processor coupled to the detector elements and adapted for processing the signals provided by the detector elements to determine at least one dynamic characteristic of a target object moving through the given region in the predetermined direction, and to classify the object in accordance with the determined dynamic characteristic as belonging to one of a plurality of different categories.

10. A system for classifying objects, comprising an array of detector elements facing a given region for detecting electromagnetic radiation of a predetermined wavelength received from the given region and for providing signals representative of said radiation detected by the detector elements;

at least one source of radiation of said predetermined wavelength disposed for propagating said radiation into the given region so that said radiation is reflected from the given region generally toward the array of detector elements;

a lens disposed for collecting and focussing said radiation reflected from the given region upon the array of detector elements; and a processor coupled to the detector elements and adapted for processing the signals provided by the detector elements to determine a profile of a target object within the given region, and to classify the object in accordance with the determined profile as belonging to one of a plurality of different profile categories.

11. A method of determining characteristics of a target object moving through a given region in a predetermined direction, comprising the steps of (a) detecting electromagnetic radiation of a predetermined wavelength received from the given region with an array of detector elements aligned in the predetermined direction and facing the given region and providing signals representative of said radiation detected by the detector elements;

(b) propagating radiation of said predetermined wavelength along a pair of fixed paths into the given region from positions disposed adjacent opposite ends of the array of detector elements so that said radiation is reflected from the given region generally toward the array of detector elements;

(c) collecting and focussing upon the array of detector elements, said radiation reflected from the given region; and (d) processing the signals provided by the detector elements to determine at least one dynamic characteristic of a target object moving through a given region in a predetermined direction.

12. A method according to claim 11, wherein the dynamic characteristic includes speed.

13. A method according to claim 12, wherein the dynamic characteristics further include acceleration.

14. A method according to claim 12, further comprising the step of (e) processing the signals provided by the detector elements to determine a profile of the target object.

15. A method according to claim 14, wherein step (e) comprises the step of (f) determining said profile by processing the signals provided by the detector elements to determine a height above a background surface of each of a series of sampled segments of the object from which radiation of the predetermined wavelength is reflected to the array of detector elements as the object is moving through the given region in said predetermined direction and by combining the height determinations with the speed determinations to determine the profile of the target object.

16. A method according to claim 11, wherein the dynamic characteristics further include acceleration.

17. A method according to claim 11, further comprising the step of (e) processing the signals provided by the detector elements to determine a profile of the target object.

18. A method for classifying objects moving through a given region in a predetermined direction, comprising the steps of (a) detecting electromagnetic radiation of a predetermined wavelength received from the given region with an array of detector elements aligned in the predetermined direction and facing the given region and providing signals representative of said radiation detected by the detector elements;

(b) propagating radiation of said predetermined wavelength along a pair of fixed paths into the given region from positions disposed adjacent opposite ends of the array of detector elements so that said radiation is reflected from the given region generally toward the array of detector elements;

(c) collecting and focussing upon the array of detector elements, said radiation reflected from the given region;

(d) processing the signals provided by the detector elements to determine at least one dynamic characteristic of a target object moving through the given region in the predetermined direction; and (e) classifying the object in accordance with the determined dynamic characteristic as belonging to one of a plurality of different categories.

19. A method for classifying objects, comprising the steps of (a) detecting electromagnetic radiation of a predetermined wavelength received from a given region with an array of detector elements facing the given region and providing signals representative of said radiation detected by the detector elements;

(b) propagating radiation of said predetermined wavelength into the given region so that said radiation is reflected from the given region generally toward the array of detector elements;

(c) collecting and focussing upon the array of detector elements, said radiation reflected from the given region;

(d) processing the signals provided by the detector elements to determine a profile of a target object within the given region; and (e) classifying the object in accordance with the determined profile as belonging to one of a plurality of different profile categories.

* * * * *